United States Patent

[11] 3,549,918

[72] Inventors Jacques Johannes Hendrik Croymans
Henricus Marinus van Hout, Emmasingel,
Einohoven, Netherlands
[21] Appl. No. 824,931
[22] Filed May 15, 1969
[45] Patented Dec. 22, 1970
[73] Assignee U.S. Philips Corporation
New York, N.Y.
a corporation of Delaware
[32] Priority May 20, 1968
[33] Netherlands
[31] No. 6807144

[54] STEPPING MOTOR FOR A LARGE NUMBER OF STEPS PER REVOLUTION
5 Claims, 12 Drawing Figs.
[52] U.S. Cl.................................................... 310/49,
310/112, 310/162
[51] Int. Cl................................................H02k 37/00
[50] Field of Search........................................... 310/49, 46,
162—64, 156, 112

[56] References Cited
UNITED STATES PATENTS
3,238,399 3/1966 Croymans et al............ 310/46
3,293,460 12/1966 Iwai et al....................... 310/49
3,372,291 3/1968 Lytle et al...................... 310/49
3,401,322 9/1968 O'Regan....................... 310/49X Primary Examiner—D. F. Duggan
Attorney—Frank R. Trifari ABSTRACT: A stepping motor comprising a plurality of coaxial stators arranged in a stack along a central axis and a rotor with permanent magnet pole portions in cooperative relationship with the stator poles. The consecutive stator-rotor systems so formed are angularly displaced by an amount equal to $m/n$ times the pitch angle of the stator poles where $n$ is equal to the number of stator-rotor systems and $m$ is an integer having a value between 1 and $(n-1)$. By selective energization of the stator coils the motor is made to move stepwise by an amount equal to the angular displacement of the stator-rotor systems or by half of this amount.

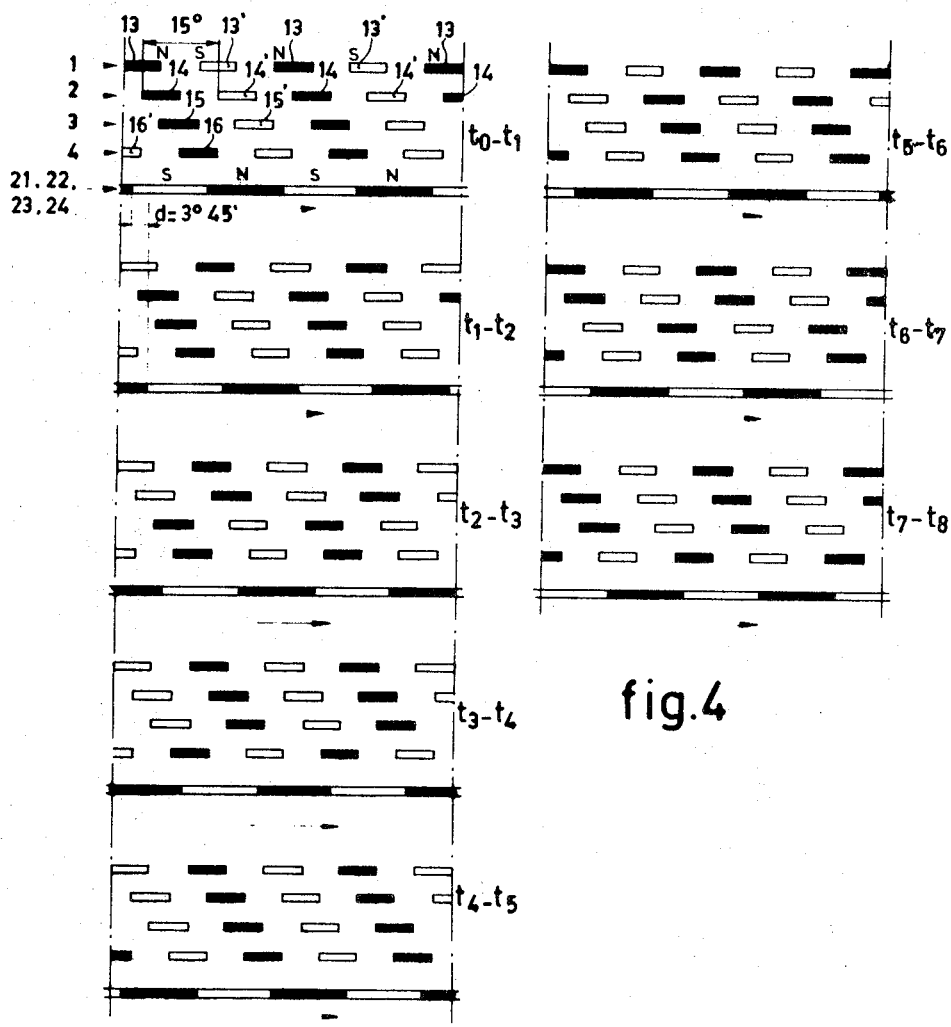
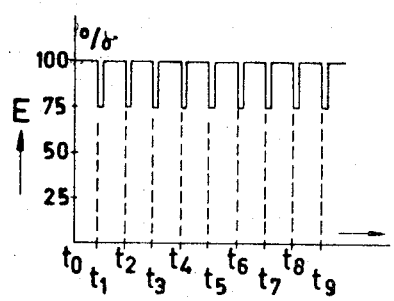
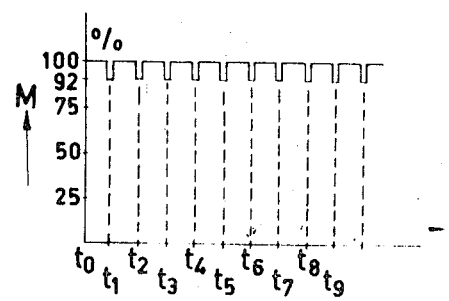
fig.4
fig.5a
fig.5b

INVENTOR.
JACQUES J.H. CROYMANS
HENRICUS M. VAN HOUT
BY

AGENT

STEPPING MOTOR FOR A LARGE NUMBER OF STEPS PER REVOLUTION

The invention relates to a stepping motor which comprises a plurality of coaxial stators each provided with at least one annular coil which is located between two plates made of a soft ferromagnetic material and having poleteeth which are arranged in a circle and, on being energized, form alternate North and South poles, which cooperate with alternate North and South poles of at least one permanent-magnetic rotor which are also arranged in a circle, the number of poles of each rotor being equal to that of each of the stators.

Such a motor is known from British patent Specification 962,755, in which two stators cooperate with one rotor, the position of the poles of one stator relative to the associated rotor poles being displaced by 90 electrical degrees with respect to the position of the poles of the other stator relative to the associated rotor poles.

This motor suffers from the disadvantage that during changeover process the output torque is reduced by about 30 percent so that the normal holding torque of the motor is about 30 percent lower than the maximum torque. Furthermore the number of steps per revolution is limited.

According to the invention this may be avoided by the use of $n$ stators, where $n$ is greater than 2, the angle between the poles of each stator relative to the associated rotor poles being different from the angle between the poles of another stator relative to the associated rotor poles, the difference being equal to $m/n$ times the pitch angle of the poles of a given stator, where $m$ is an integer and varies between 1 and $(n-1)$. The term "pitch angle" is used herein to denote the angle between the axes of two adjacent poles of one stator, which axes are situated in a plane at right angles to the axis of the motor and intersect this axis.

In such a motor having, for example, four stators the torque varies by only about 8 percent so that the mean output torque is more than doubled when the energy supply is doubled. In addition, the number of steps per revolution is doubled.

At the same switching frequency of the control signal of, for example, 100 c/s, in the known motor the switching frequency per stator is 50 c/s and in the motor in accordance with the invention 25 c/s, so that either with the same number of steps per minute the iron losses are reduced or at the same switching frequency of the stators with the same losses the frequency of the control signal and hence the number of steps per minute can be doubled.

The mass inertia of the rotor is proportional to the number of stators and the torque varies more than proportionally therewith so that the acceleration of the rotor is relatively increased with consequent increase in the starting speed and hence in the starting frequency.

In an embodiment of a motor in accordance with the invention each coil comprises two halves. This enables the stators to be controlled by pulses having the same direction, while retaining the possibility of changing the polarity of the field. This is of particular importance when the motor is electronically controlled. In this construction, the two coil halves either may be completely separate or may comprise two continuously wound coils, the end of one coil being connected to the beginning of the second coil and being brought out.

A further embodiment of a motor in accordance with the invention in the steady-state condition all the stators are energized and for each step the polarity of that stator is reversed which, viewed in a direction opposite to the desired direction of rotation, has the greatest angle between the stator poles and the associated rotor poles. Thus, the stepping motor takes a number of steps per revolution which is equal to $n$ times the number of poles per stator.

In another embodiment of a motor in accordance with the invention, in the steady-state condition alternatively $n$ and $(n-1)$ stators are energized and for the next step that stator is switched out of circuit which, viewed in a direction opposite to the desired direction of rotation, has the largest angle between the stator poles and the associated rotor poles, and the nonenergized stator is energized in a direction opposite to the preceding direction of energization. Thus, the number of steps per revolution is doubled and is equal to $2n$ times the number of poles per stator, the holding torque in, for example, a motor having four stators varying only by about 8 percent.

Features and advantages of the invention will appear from the following description of embodiments thereof, given by way of example only, with reference to the accompanying drawings, in which:

FIG. 4 shows the order in which the stators are energized and the associated positions of the rotor;

FIG. 5a shows the energy supplied and FIG. 5b the output torque as a function of time;

Figure 1:
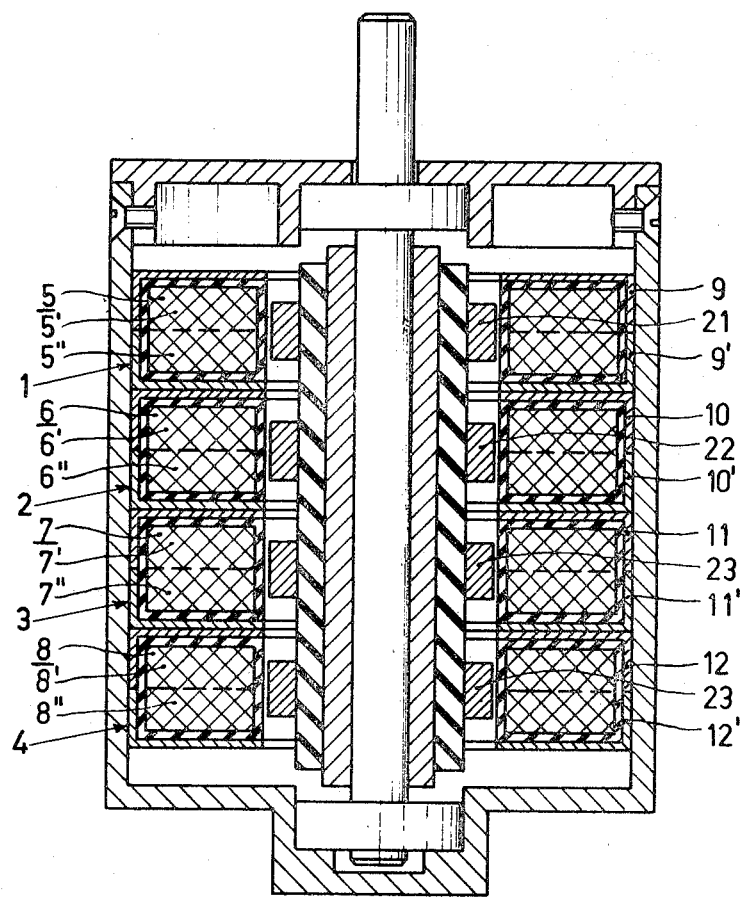
FIG. 1 is a longitudinal sectional view of the motor according to the invention.
Figure 2:
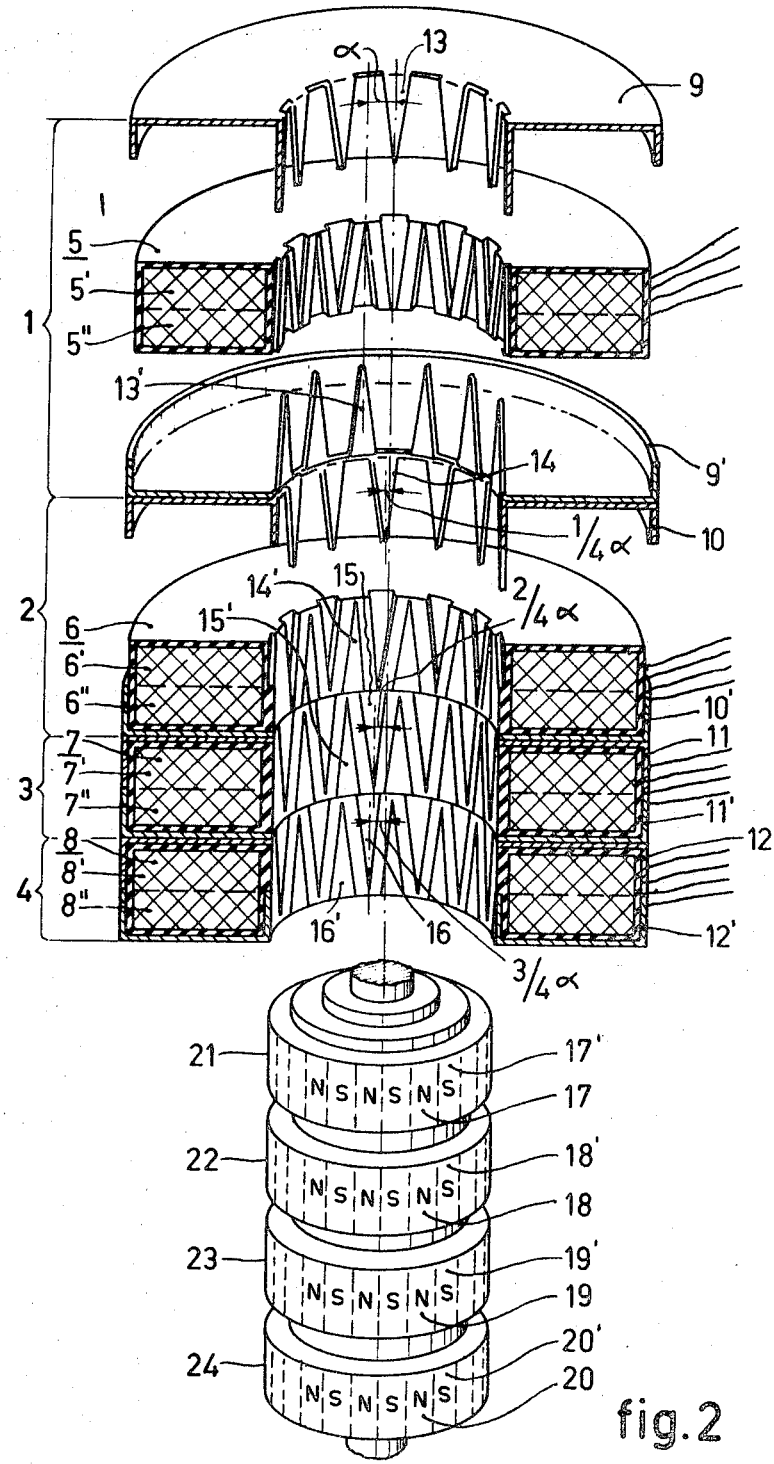
FIG. 2 is a perspective view thereof.

FIGS. 1 and 2 show a motor comprising four coaxial stators 1, 2, 3 and 4, which are each provided with an annular coil 5, 6, 7 and 8, respectively, which is located between two plates made of a soft ferromagnetic material 9,9'–10,10'; 11,11'; 12,12'; respectively, and having pole pieces arranged in a circle which on energization form alternate North and South poles 13, 13'; 14, 14'; 15, 15'; 16, 16'; each plate 9, 9'; 10, 10'; 11, 11'; and 12, 12' having twelve teeth which cooperate with twenty-four alternate North and South poles likewise arranged in a circle 17, 17'; 18, 18'; 19, 19'; 20, 20'; of four permanent-magnetic rotors 21, 22, 23 and 24, respectively.

The angles between the poles, 13, 13'; 14, 14'; 15, 15'; 16, 16'; respectively of each stator 1, 2, 3 and 4 relative to the associated rotor poles 17, 17'; 18, 18'; 19, 19'; 20, 20' are different, the difference being equal to $m/n$ times the pitch angle of the poles of the respective stator, where $m$ is an integer and varies between 1 and 3, and $n$ is equal to 4. In the motor under consideration the pitch angle $\alpha$ is 15° so that the said differences are 3° 45', 7°30', and 11°15', respectively.

In this motor, the like poles 17, 18, 19, 20 and 17', 18', 19', 20' of the rotors 21, 22, 23, 24, respectively, are axially aligned so that the stators 2, 3 and 4 are displaced with respect to the stator 1 through angles of $\tfrac{1}{4}\alpha = 3°45'$, $\tfrac{1}{2}\alpha = 7°30'$ and $\tfrac{3}{4}\alpha = 11°15'$, respectively. Obviously, the four rotors shown may be replaced by a single rotor extending through the four stators. Furthermore, the stators may naturally be axially aligned and the rotors may be arranged at the same relative angles as the stators shown in FIGS. 1 and 2, and even both the stator poles and the rotor poles may be unaligned, if it is only ensured that the above relation is satisfied.

The annular coils 5, 6, 7 and 8 may each comprise one winding or two halves, each half magnetizing the associated stator in a given direction.

Thus, the coils 5, 6, 7 and 8 comprise two halves 5', 5''; 6', 6''; 7', 7''; 8', 8''; respectively, a current flowing through the coil halves 5', 6', 7' and 8' causing the stator poles 13, 14, 15 and 16 to become North poles and the stator poles 13', 14', 15' and 16', respectively, to become South poles whereas a current flowing through the coils 5'', 6'', 7'' and 8'' causes the stator poles 13, 14, 15 and 16 to become South poles and the stator poles 13', 14', 15' and 16', respectively, to become North poles. Thus, the stator may be magnetized in two opposite directions by one direct voltage and hence by means of pulses having the same directions.

Figure 3:
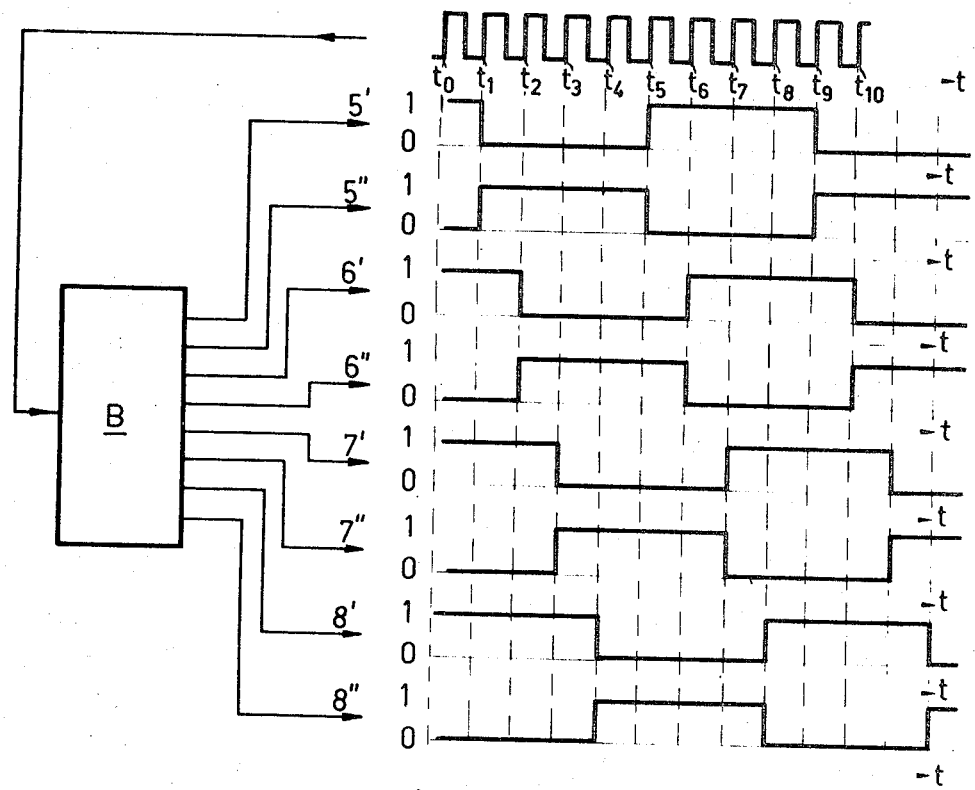
FIG. 3 is a control circuit for the motor.

FIG. 3 shows a control unit B for controlling a motor as shown in FIGS. 1 and 2 by means of pulses, all the stators 1, 2, 3 and 4 being energized in the steady-state condition, while for each step the polarity of that stator is changed which, viewed in a direction opposite to the desired direction of rotation, has the largest angle between the stator poles and the associated rotor poles. Thus, the stepping motor takes a number of steps per revolution which is equal to 4 times the number of poles per stator.

The control pulses are applied to the input of the control unit B, in which they are converted into control voltages appearing at the 8 outputs which are each connected to one stator coil half. The waveforms of the output voltages are shown in the right-hand half of the FIG.

FIG. 4 is a developed view of part of the motor, the North poles being indicated by black rectangles and the South poles by white rectangles. Since all the rotor poles are aligned, only one rotor is shown. At the instant $t_0$ the poles 13, 14, 15 and 16 are North poles and the poles 13', 14', 15' and 16' are South poles, since the coil halves 5', 6', 7' and 8' are energized. At the instant $t_1$ the poles 13 become South poles and the poles 13' become North poles, since the coil half 5' is switched out of circuit and the coil half 5" is switched into circuit. As a result, the rotor moves through a distance $d$ in the direction indicated by the arrows. This distance corresponds to an angle which is equal to one quarter of the pitch angle $\alpha$, i.e. equal to 3° 45' in the embodiment under consideration. At the instant $t_2$ the coil half 6' is switched out of circuit and the coil half 6" is switched into circuit so that the poles 14 become South poles and the poles 14' become North poles with the result that the rotor rotates again through an angle of 3° 45'. The coils 7', 7" and 8', 8" are now successively switched out of circuit and into circuit respectively, which is shown in FIG. 3, until at the instant $t_9$ the initial condition which prevailed at the instant $t_0$ is reached again, the rotor having rotated through an angle of 30° in eight steps. Thus, the number of steps per revolution, which would be 48 if two stators were used, is doubled so as to be 96.

FIG. 5a, which represents the variation of the energy supplied as a function of time, shows that during the switching-over process the energy supplied is briefly decreased by 25 percent, but, as is shown in FIG. 5b, the output torque is decreased by only 8 percent so that the uniformity of the output torque is greatly improved.

Figure 6:
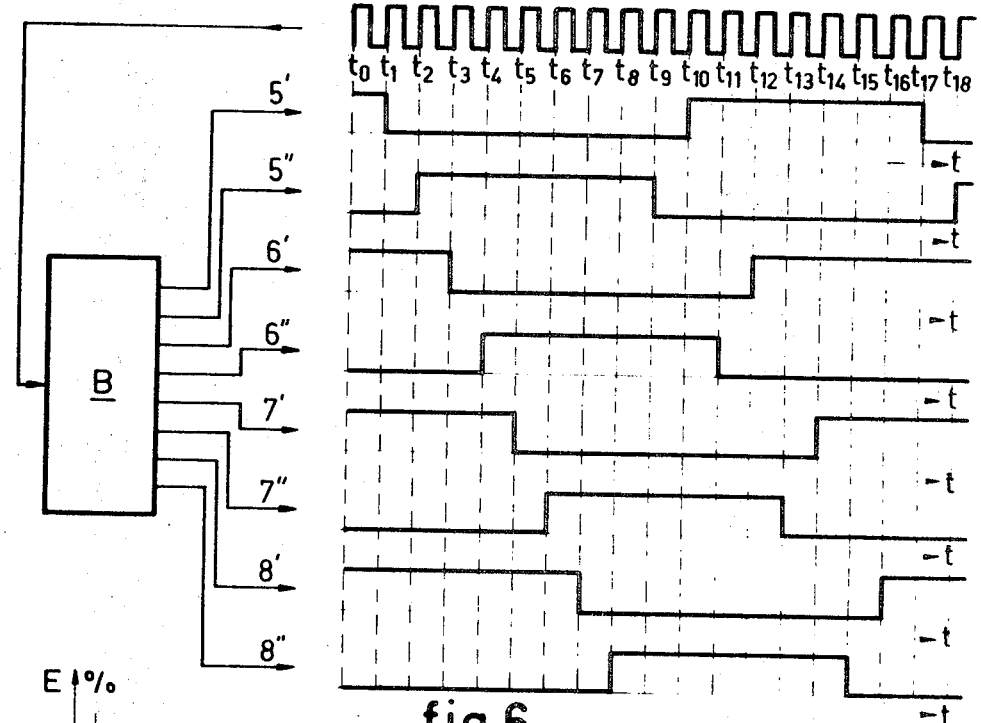
FIG. 6 shows a control circuit for a motor having twice the number of steps per revolution.
Figure 8A:
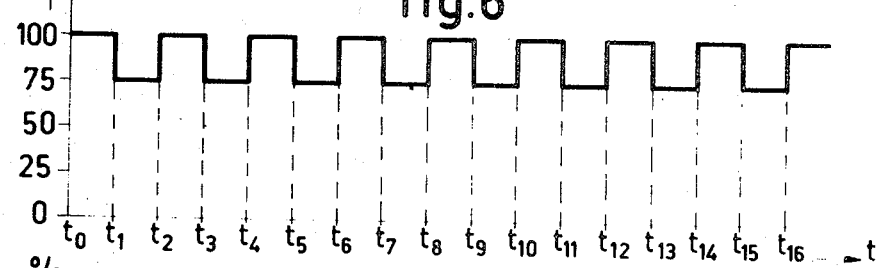
FIG. 8a shows the energy supplied and FIG. 8b the output torque both as a function of time.
Figure 8B:
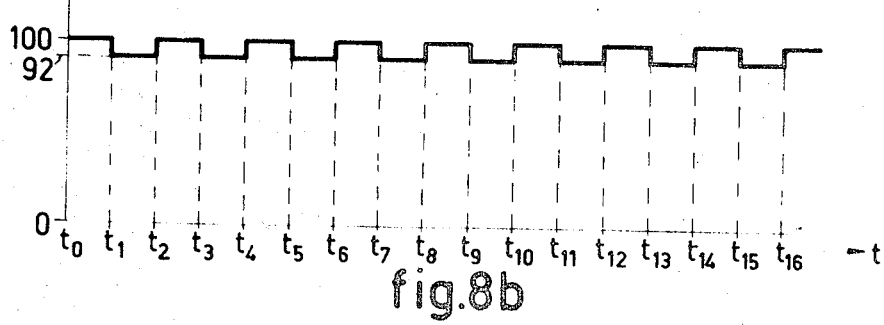
Figure 7:
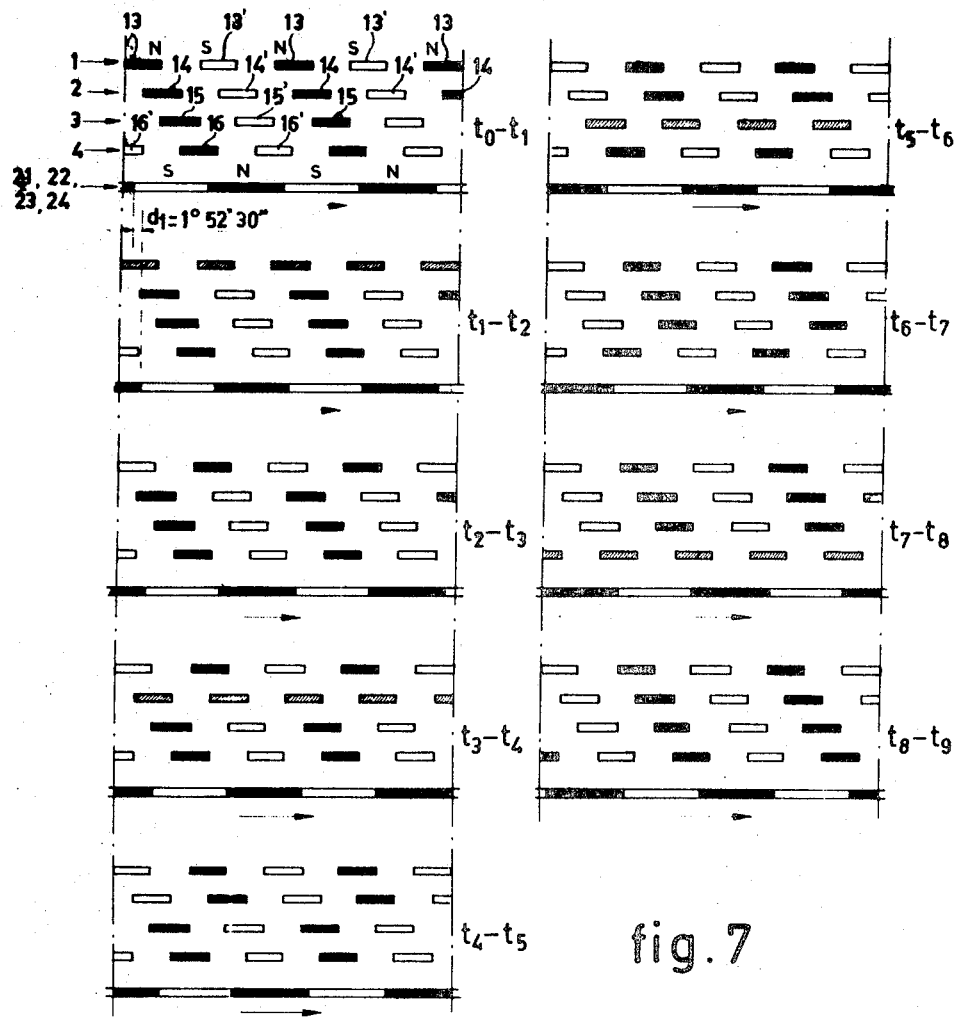
FIG. 7 shows the order in which the stators are energized and the associated positions of the rotor.

In this motor the number of steps may be doubled in that in the steady-state condition alternately 4 and 3 stators are energized and in that for the next step in the former case that stator is switched out of circuit which, viewed in a direction opposite to the desired direction of rotation, has the largest angle between the stator poles and the associated rotor poles, and in the latter case the nonenergized stator is energized in a direction opposite to the preceding one, as is shown in FIG. 6. At the instant $t_0$ the poles 13, 14, 15 and 16 are North poles and the poles 13', 14', 15' and 16' are South poles again, since the coil halves 5', 6', 7' and 8' are energized and the coils 5", 6", 7" and 8" are not energized. At the instant $t_1$ and the coil half 5' is switched out of circuit, with the result that the rotor moves through a distance $d_1$, i.e. through an angle of 1° 52' 30". At the next pulse at the instant $t_2$, the coil half 5" is switched into circuit, the rotor again moving through an angle of 1° 52' 30". At the instant $t_3$ the coil half 6' is switched out of circuit and at the instant $t_4$ the coil half 6" is switched into circuit, so that alternatively three and four stators are energized. The various steps are shown in FIG. 7 for one half of the cycle, the North poles being represented by black rectangles, the nonenergized pole teeth being represented by shaded rectangles and the remaining poles being South poles. The variation of the energy supplied is shown in FIG. 8a and that of the output torque in FIG. 8b. The number of steps of the motor now is 192 and the output torque varies by only about 8 percent. The control unit B may be a mechanical switch, as is shown diagrammatically, in FIG. 9 for 96 steps and in FIG. 10 for 192 steps. Such a switch may be driven, for example, by a second stepping motor which is controlled by the input pulses and takes 8 and 16 steps respectively per revolution.

Figure 9:
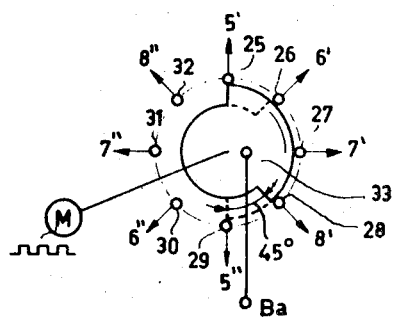
FIG. 9 shows a mechanical embodiment of a control unit.
Figure 10:
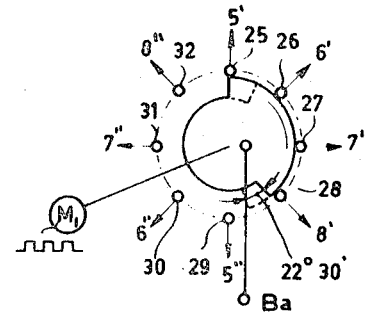
FIG. 10 shows such a control unit for twice the number of steps per revolution.

The switch comprises eight contacts 25, 26, 27, 28, 29, 30, 31 and 32 which are arranged in a circle and are each connected to one of the coil halves 5', 6', 7', 8', 5", 6", 7" and 8". Along these contacts there moves a metal segment 33 which is connected to one terminal of a direct-voltage source Ba and, if the stepping motor according to the invention is to take 96 steps per revolution, is driven by a second stepping motor M taking 8 steps per revolution, so that at each pulse the segment is rotated through 45°, as is shown in FIG. 9, and if the motor according to the invention is to take 192 steps per revolution, is driven by a stepping motor $M_1$ taking 16 steps per revolution, so that the segment is rotated through 22° 30' at each pulse, as is shown in FIG. 10.

The motors M and $M_1$ are driven by the input pulses of the control unit B of FIG. 3 and FIG. 6, respectively.

As a matter of fact, obviously the mechanical switch may be replaced by an electronic switch.

We claim:

1. A stepping motor comprising a plurality of stator members arranged along a given central axis, said stator members being in an a quantity $n$ greater than 2 and each comprising two spaced magnetic frame members having circular central openings coaxial to said central axis, said frame members comprising integral inner portions extending towards each other and arranged in alternate spaced relationship to form pairs of magnetic pole members extending substantially parallel to said central axis, coil members each interposed between each pair of frame members thereby to magnetize the associated pole members, rotor means having an axis coincident with said central axis and comprising a plurality of rotor sections each associated with a given stator member thereby to form a plurality of stator-rotor systems, each of said rotor sections comprising a plurality of pairs of permanent magnet poles equal to the number of pairs of said stator magnetic poles, said stator-rotor systems being angularly displaced relative to each other about said central axis by an amount equal to $m/n$ times the pitch angle of the pole members of said stator members, where $n$ is equal to the number of the stator-rotor systems and $m$ is an integer having a value between 1 and $(n-1)$.

2. A stepping motor as claimed in claim 1 wherein said coil members comprise two winding sections.

3. A stepping motor as claimed in claim 1, wherein said stator members are angularly displaced thereby to produce the said angular displacement of said stator-rotor systems.

4. A stepping motor as claimed in claim 1 further comprising means for selectively energizing said coil members in sequence and in the same magnetic direction thereby to produce a stepwise movement of said rotor equal to the angular displacement of said stator-rotor systems.

5. A stepping motor as claimed in claim 1 further comprising means for selectively energizing one of said coil members in a given magnetic direction and others of said coil members in the opposite magnetic direction thereby to produce a stepwise movement of said rotor equal to one-half of the angular displacement of said stator-rotor systems.